US007553428B2

(12) United States Patent
Lee et al.

(10) Patent No.: US 7,553,428 B2
(45) Date of Patent: Jun. 30, 2009

(54) METHOD OF FABRICATING SPACERS AND METHOD OF INSTALLING SPACERS IN FLAT PANEL DEVICE

(75) Inventors: Jeong-Hee Lee, Seongnam-si (KR); Tae-Won Jeong, Seoul (KR); Jeong-Na Heo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 659 days.

(21) Appl. No.: 11/200,234

(22) Filed: Aug. 10, 2005

(65) Prior Publication Data

US 2006/0035559 A1 Feb. 16, 2006

(30) Foreign Application Priority Data

Aug. 11, 2004 (KR) ...................... 10-2004-0063092

(51) Int. Cl.
*C03C 15/00* (2006.01)

(52) U.S. Cl. ............................ 216/97; 216/96; 216/98; 313/422; 313/423

(58) Field of Classification Search .................. 216/97, 216/98, 99; 313/422, 423, 4
See application file for complete search history.

(56) References Cited

U.S. PATENT DOCUMENTS

| | | | | |
|---|---|---|---|---|
| 4,780,395 | A * | 10/1988 | Saito et al. | 430/315 |
| 5,108,961 | A * | 4/1992 | Zhong et al. | 501/65 |
| 2003/0197459 | A1* | 10/2003 | Takenaka et al. | 313/422 |
| 2004/0058613 | A1* | 3/2004 | Hofmann et al. | 445/24 |
| 2004/0121695 | A1* | 6/2004 | Lin et al. | 445/24 |

* cited by examiner

*Primary Examiner*—Lan Vinh
(74) *Attorney, Agent, or Firm*—Robert E. Bushnell, Esq.

(57) ABSTRACT

A method of fabricating spacers for use in a flat panel device includes: preparing a core glass having a low solubility in a chemical etching solution and a tube glass having a high solubility in the chemical etching solution and having a larger inner diameter than an outer diameter of the core glass; inserting the core glass into the tube glass to obtain a cylindrical glass; drawing the cylindrical glass at a predetermined temperature until the core glass has a predetermined diameter; cutting the drawn cylindrical glass to a predetermined length; and removing the tube glass in the cylindrical glass using the chemical etching solution.

12 Claims, 7 Drawing Sheets

METHOD OF FABRICATING SPACERS AND METHOD OF INSTALLING SPACERS IN FLAT PANEL DEVICE

CLAIM OF PRIORITY

This application makes reference to, incorporates the same herein, and claims all benefits accruing under 35 U.S.C. § 119 from an application entitled METHOD OF FABRICATING SPACERS AND METHOD OF INSTALLING SPACERS IN FLAT PANEL DEVICE, earlier filed in the Korean Intellectual Property Office on 11 Aug. 2004 and there duly assigned Serial No. 10-2004-0063092.

BACKGROUND OF THE INVENTION

1. Field of the Invention

The present invention relates to a method of fabricating cylindrical spacers used in a flat panel device and a method of installing the spacers on a substrate of the flat panel device.

2. Description of the Related Art

In a flat panel device, spacers are used to provide a vacuum area between a front substrate and a rear substrate. Flat panel devices that use such spacers include Liquid Crystal Displays (LCDs) and Field Emission Displays (FEDs).

The spacers must have an insulating property since they support the front substrate and the rear substrate and are in contact with the substrates and must have a sufficient stiffness to resist a pressure difference between the inside and the outside of the flat panels resulting from the high vacuum area inside the flat panels.

A spacer can have a flat rod shape and is placed across a display. The spacer can also have a grating shape or a cylindrical shape.

A spacer having a rod shape or a grating shape can be fabricated using a laser cutting method or a patterning method.

However, a spacer having a cylindrical shape cannot be easily manufactured and installed in a flat panel device.

SUMMARY OF THE INVENTION

The present invention provides a method of fabricating cylindrical spacers using a drawing property of glass.

The present invention also provides a method of installing cylindrical spacers on a substrate of a flat panel device in a convenient manner.

According to one aspect of the present invention, a method of fabricating spacers is provided, the method comprising: preparing a core glass having a low solubility in a chemical etching solution and a tube glass having a high solubility in the chemical etching solution and having a larger inner diameter than an outer diameter of the core glass; inserting the core glass into the tube glass to obtain a cylindrical glass; drawing the cylindrical glass at a predetermined temperature until the core glass has a predetermined diameter; cutting the drawn cylindrical glass to a predetermined length; and removing the tube glass in the cylindrical glass using the chemical etching solution.

The core glass preferably comprises silicate glass including a large amount of PbO.

The chemical etching solution preferably comprises hydrochloric or acetic acid.

The tube glass preferably comprises BaO—B2O3 based silicate glass.

The predetermined temperature is preferably in a range of 650-700 degrees C.

The predetermined diameter is preferably in a range of 20-100 micrometers.

The predetermined length is preferably 1.1 mm.

According to another aspect of the present invention, a method of installing spacers in a flat panel device is provided, the method comprising: preparing a mold having grooves, each groove having a radius corresponding to that of a spacer; disposing each of the spacers in each groove of the mold and assembling another mold on the mold having the spacers disposed therein; disposing the assembled molds on a substrate so that the spacers are vertically arranged on the substrate; and removing the molds from the substrate.

Disposing each of the spacers preferably further comprises coating an adhesive on one end of each of the spacers; and disposing the assembled molds on the substrate so that the one end of each of the spacers coated with the adhesive contacts the substrate.

Each of the molds preferably has grooves on both opposite sides and distances between the grooves respectively correspond to spacing distances between the spacers arranged on the flat panel device.

According to yet another aspect of the present invention, a method of installing spacers in a flat panel device is provided, the method comprising: coating a magnetic material on one end of each of the spacers; disposing magnetic dots at positions where the spacers are to be installed on a plate; magnetizing the magnetic material; placing the spacers on the plate and applying a magnetic field to the plate to attach the spacers to the magnetic dots; coating an adhesive on an other end of each of the spacers; aligning the plate on a substrate so that the other end of each of the spacers is attached to the substrate; and removing the magnetic field applied to the plate and separating the plate from the substrate.

Distances between the magnetic dots preferably correspond to spacing distances between the spacers arranged on the flat panel device.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
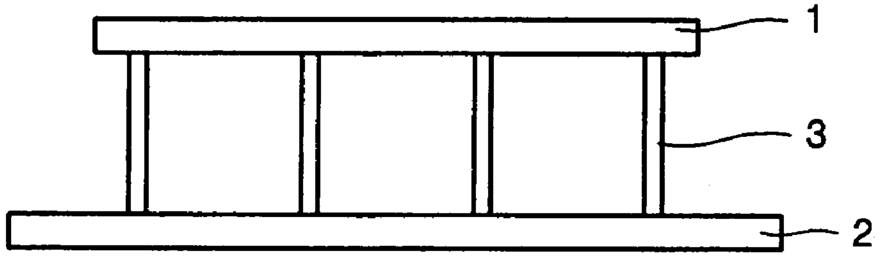
FIG. 1 is a schematic cross-sectional view of a flat panel device.
Figure 2:
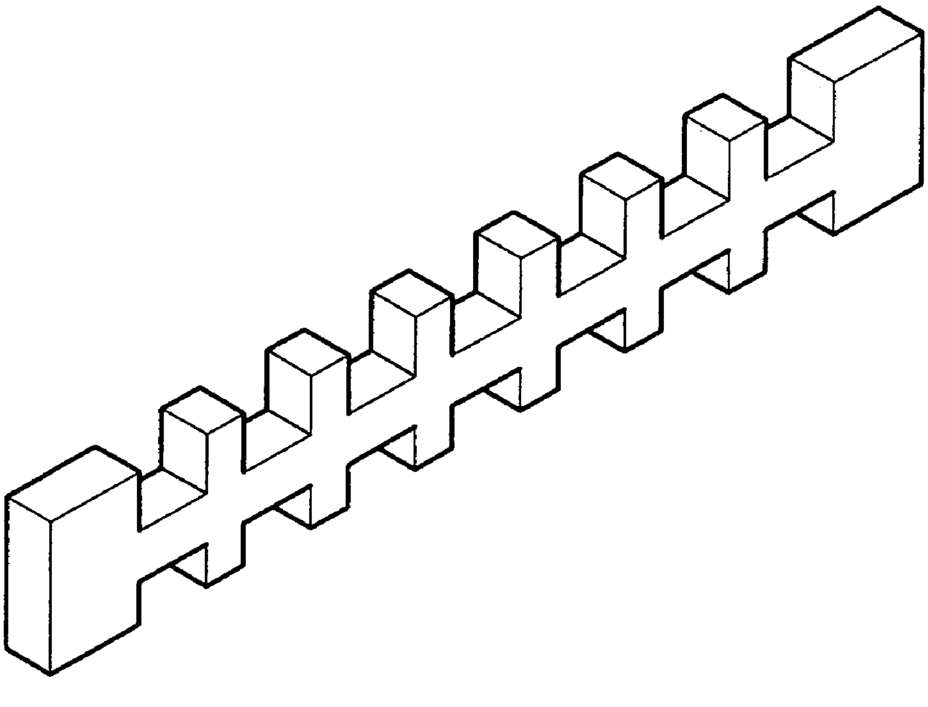
FIG. 2 is a schematic perspective view of the structure of a spacer.

FIG. 1 is a schematic perspective view of a structure of a flat panel device. FIG. 2 is a schematic perspective view of a structure of a spacer used in the device of FIG. 1.

Referring to FIG. 1, spacers 3 are used to provide a vacuum area between a front substrate 1 and a rear substrate 2 in the flat panel device. Flat panel devices that use such spacers 3 include Liquid Crystal Displays (LCDs) and Field Emission Displays (FEDs).

The spacers 3 must have an insulating property since they support the front substrate 1 and the rear substrate 2 and are in contact with the substrates 1 and 2 and must have a sufficient stiffness to resist a pressure difference between the inside and the outside of the flat panels resulting from the high vacuum area inside the flat panels.

The spacer illustrated in FIG. 2 has a flat rod shape and is placed across a display. The spacer can also have a grating shape or a cylindrical shape.

Hereinafter, a method of fabricating spacers according to an embodiment of the present invention is described in detail with reference to FIGS. 3A through 3D.

Figure 3A:
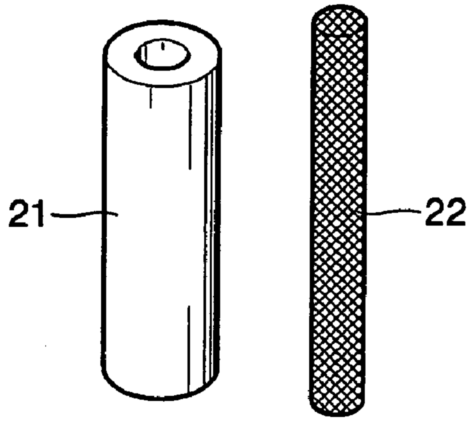
FIGS. 3A through 3D are views of a method of fabricating spacers according to an embodiment of the present invention.

Referring to FIG. 3A, a tube glass 21 which has a high solubility in a predetermined chemical etching solution and a core glass 22 which has a very low solubility in the chemical etching solution are provided. The tube glass 21 has a larger diameter than the core glass 22. The inner diameter of the tube glass 21 and the outer diameter of the core glass 22 can be about 1-5 mm. Glass used in fabricating a MicroChannel Plate (MCP) can be used for the tube glass 21 and the core glass 22. For example, BaO—B2O3 based silicate glass can be used for the tube glass 21 and silicate glass containing a large amount of PbO can be used for the core glass 22. About 1 N hydrochloric acid or acetic acid solution can be used as the chemical etching solution. Compositions of such glasses are disclosed in U.S. Pat. No. 4,112,170.

Figure 3B:
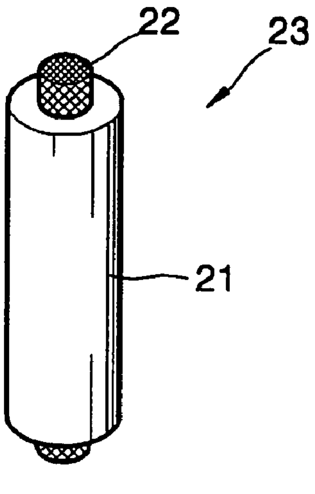

Referring to FIG. 3B, the core glass 22 is inserted into the tube glass 21 to obtain a cylindrical glass 23.

Figure 3C:
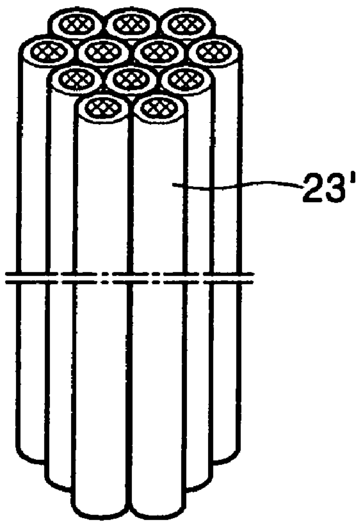

Referring to FIG.3C, a plurality of the cylindrical glasses 23 are assembled and drawn at a predetermined temperature, for example, 650-700 degrees C., using a draw machine until the core glass 22 has a desired diameter, for example, 20-100 micrometers.

Figure 3D:
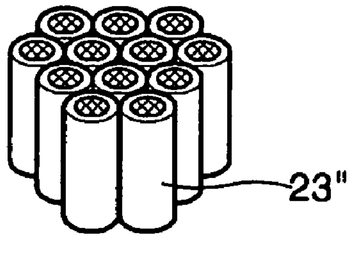

Referring to FIG. 3D, a plurality of the cylindrical glasses 23' obtained in the previous procedure are cut to a desired spacer length, for example, 1.1 mm. Then, both ends of the cut cylindrical glasses 23" can be polished.

Then, the cut cylindrical glasses 23" are immersed into a chemical etching solution, for example, 1 N hydrochloric acid solution to etch the tube glasses 21. Through this etching procedure, a plurality of spacers, separated from each other, can be obtained.

Hereinafter, a method of installing spacers in a flat panel device according to an embodiment of the present invention is described in detail with reference to FIGS. 4A through 4C.

Figure 4A:
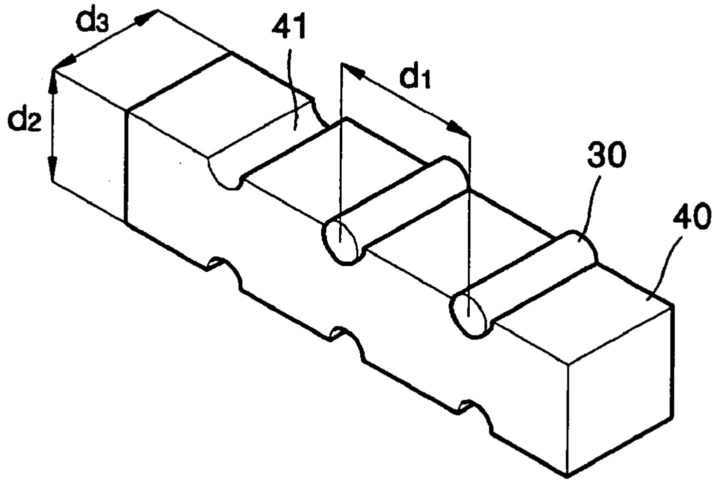
FIGS. 4A through 4C are views of a method of fabricating spacers according to another embodiment of the present invention.

Referring to FIG. 4A, a mold 40 has grooves 41 into which spacers 30 are inserted. Specifically, each of both opposite sides of the mold 40 has grooves 41 spaced apart from each other by a predetermined distance d1 and corresponding grooves 41 on both the sides are spaced apart from each other by a distance d2. The distances d1 and d2 correspond to spacing distances between the spacers 30 respectively actually installed on a flat panel device, in a first direction and a second direction which is perpendicular to the first direction. Distance d3 can be about 1.0 mm, which is shorter than a length of the spacers 30, for example, 1.1 mm.

Figure 4B:
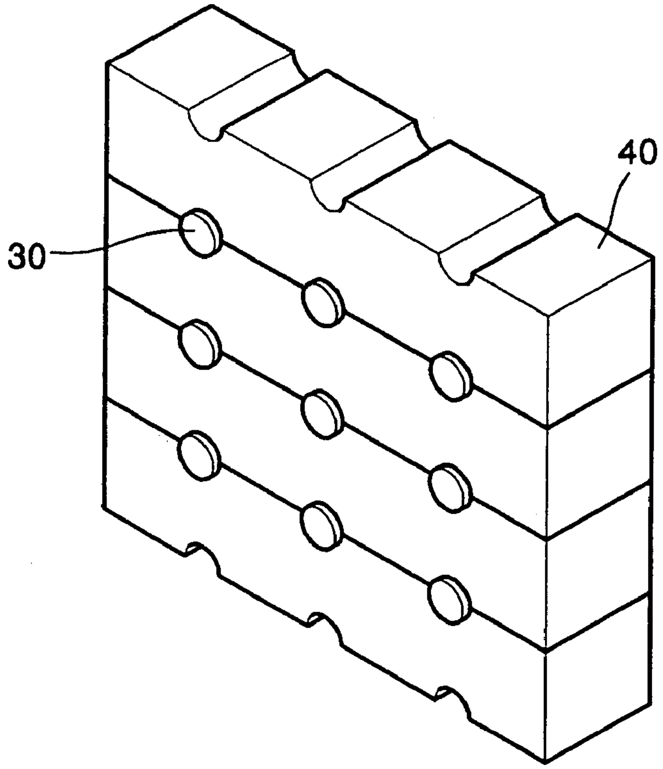

Referring to FIG. 4B, each of the spacers 30 is placed in each of grooves 41 on one side of the mold 40 and another mold 40 is layered on the mold 40 provided with the spacers 30. After the spacers 30 are placed in the grooves 41, an adhesive is coated on one end of each of the spacers 30.

Figure 4C:
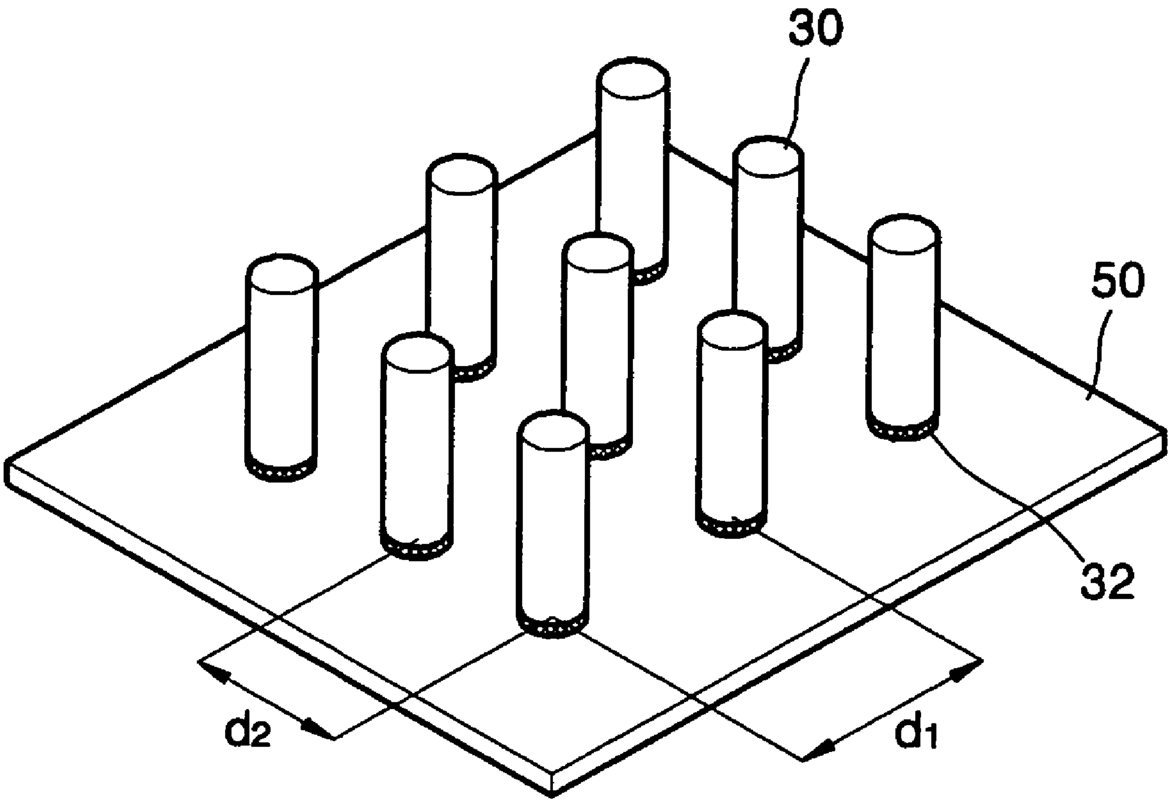

Referring to FIG. 4C, the obtained molds 40 are placed on a substrate 50 so that one end of each of the spacers 30 coated with the adhesive contacts the substrate 50. Then, the molds 40 are removed to obtain the substrate 50 having the spacers 30 arranged thereon. Such arrangement of the spacers 30 is constantly controlled by the design of the distances d1 and d2 during fabrication of the mold 40. The substrate 50 will be a front substrate or a rear substrate of the flat panel device. Reference numeral 32 denotes a portion in which the adhesive is coated.

Hereinafter, a method of installing spacers in a flat panel device according to another embodiment of the present invention is described in detail with reference to FIGS. 5A through 5D.

Figure 5A:
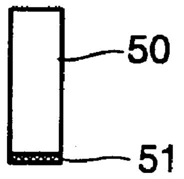
FIGS. 5A through 5D are views of a method of fabricating spacers according to still another embodiment of the present invention.

Referring to FIG. 5A, a magnetic material 51 is coated on one end of a spacer 50. Examples of the magnetic material 51 include Fe, Co, Ni, or their alloys or oxides.

Figure 5B:
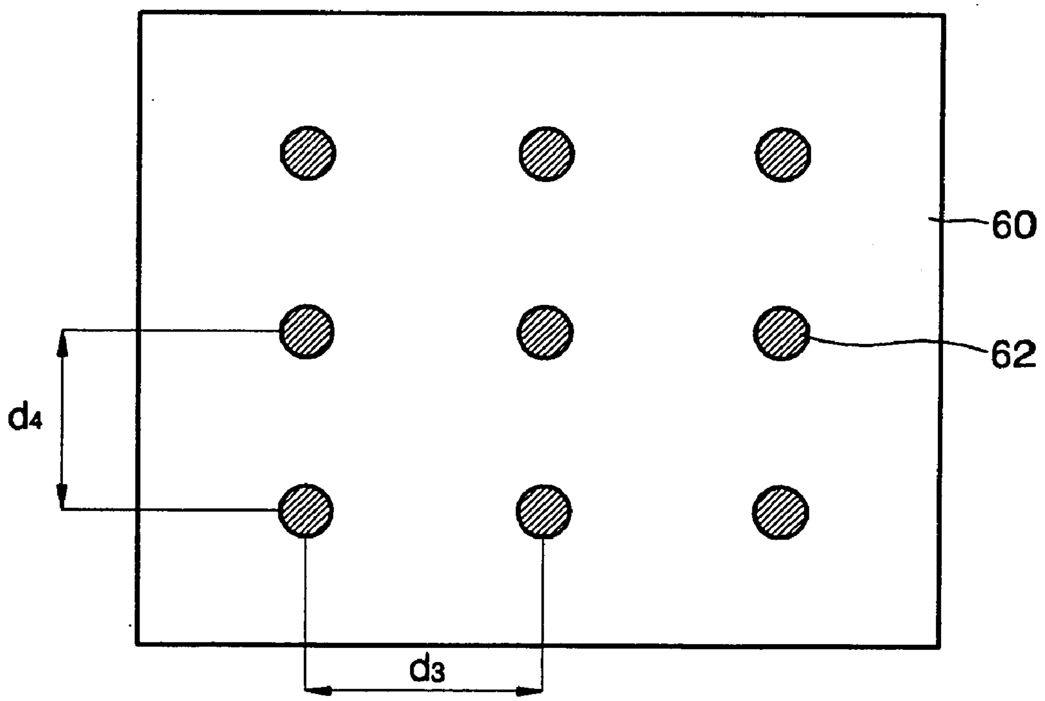

Referring to FIG. 5B, magnetic dots 62 are disposed at positions where spacers 50 will be arranged on a plate 60. A distance between the magnetic dots 62 in a first direction is d3 and a distance between the magnetic dots 62 in a second direction which is perpendicular to the first direction is d4. The magnetic dots 62 can be made of Fe, Co, Ni, or their alloys or oxides. When a magnetic field is applied to the plate 60, the magnetic dots 62 are magnetized.

Figure 5C:
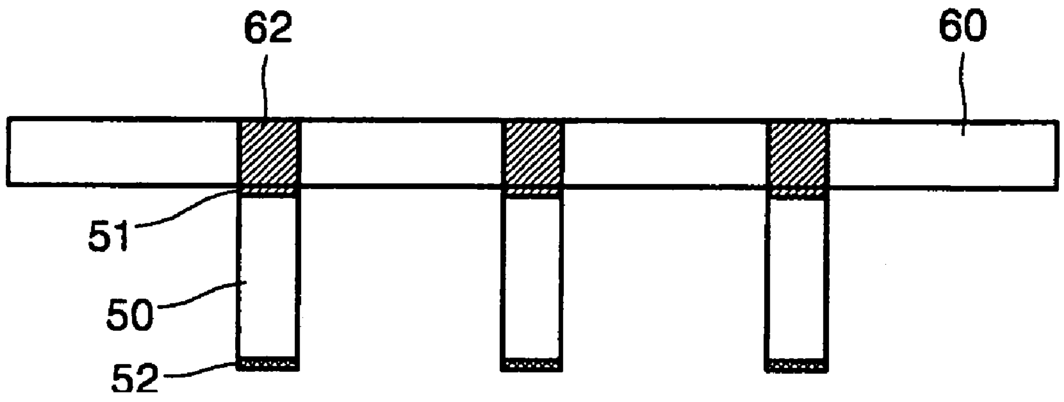

Referring to FIG. 5C, the spacers 50 are placed on the plate 60 and when a magnetic field is applied to the plate 60, the one end of each of the spacers 50 coated with the magnetic material 51 is attached to the magnetic dots 62 by a magnetic force.

Then, an adhesive 52 is coated on the other end of each of the spacers 50. For example, the other end of each of the spacers 50 can be easily coated with the adhesive by placing the plate 60 on the adhesive.

Figure 5D:
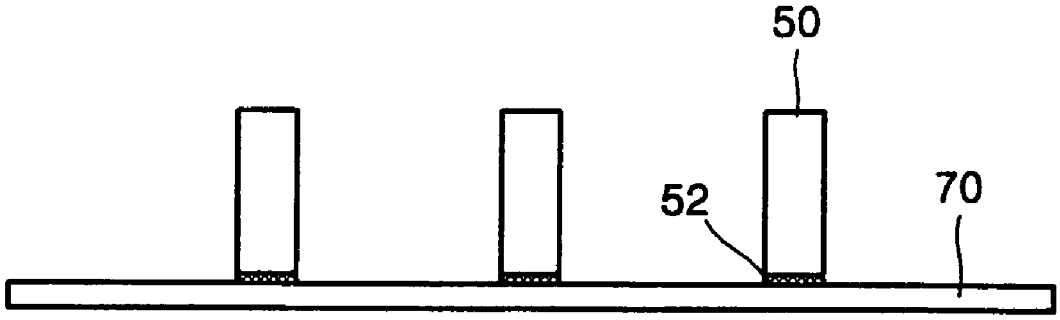

Referring to FIG. 5D, the plate 60 is aligned with a substrate 70 so that the spacers 50 are arranged on the substrate 70. Then, after the magnetic field is removed, the plate 60 is separated from the substrate 70 and the spacers 50 are attached to the substrate 70. Such arrangement of the spacers 50 is constantly controlled by the design of the distances d3 and d4 during fabrication of the plate 60. The substrate 70 can be a front substrate or a rear substrate of the flat panel device. Advantageously, the magnetic material 51 on the one end of each of the spacers can be removed therefrom.

As explained above, the method of fabricating spacers according to the present invention can provide cylindrical spacers without a complicated patterning process. In addition, the method of installing spacers according to the present invention can facilitate an arrangement of the spacers on a substrate.

While the present invention has been particularly shown and described with reference to exemplary embodiments thereof, it will be understood by those of ordinary skill in the art that s various modifications in form and detail can be made therein without departing from the spirit and scope of the present invention as defined by the following claims.

What is claimed is:

1. A method of fabricating spacers, comprising:

preparing a core glass having a low solubility in a chemical etching solution and a tube glass having a high solubility in the chemical etching solution and having a larger inner diameter than an outer diameter of the core glass;

inserting the core glass into the tube glass to obtain a cylindrical glass;

drawing the cylindrical glass at a predetermined temperature until the core glass has a predetermined diameter;

cutting the drawn cylindrical glass to a predetermined length; and removing the tube glass in the cylindrical glass using the chemical etching solution.

2. The method of claim 1, wherein the core glass comprises silicate glass including a large amount of PbO.

3. The method of claim 1, wherein the chemical etching solution comprises hydrochloric or acetic acid.

4. The method of claim 1, wherein the tube glass comprises a BaO—B2O3based silicate glass.

5. The method of claim 1, wherein the predetermined temperature is in a range of 650-700 degrees C.

6. The method of claim 1, wherein the predetermined diameter is in a range of 20-100 micrometers.

7. The method of claim 1, wherein the predetermined length is 1.1mm.

8. A method of installing spacers in a flat panel device, comprising:

preparing a mold having grooves, each groove having a radius corresponding to that of a spacer;

disposing each of the spacers in each groove of the mold and assembling another mold on the mold having the spacers disposed therein;

disposing the assembled molds on a substrate so that the spacers are vertically arranged on the substrate; and removing the molds from the substrate.

9. The method of claim 8, wherein disposing each of the spacers further comprises coating an adhesive on one end of each of the spacers; and disposing the assembled molds on the substrate so that the one end of each of the spacers coated with the adhesive contacts the substrate.

10. The method of claim 8, wherein each of the molds has grooves on both opposite sides and distances between the grooves respectively correspond to spacing distances between the spacers arranged on the flat panel device.

11. A method of installing spacers in a flat panel device, comprising:

coating a magnetic material on one end of each of the spacers;

disposing magnetic dots at positions where the spacers are to be installed on a plate;

magnetizing the magnetic material;

placing the spacers on the plate and applying a magnetic field to the plate to attach the spacers to the magnetic dots;

coating an adhesive on an other end of each of the spacers;

aligning the plate on a substrate so that the other end of each of the spacers is attached to the substrate; and removing the magnetic field applied to the plate and separating the plate from the substrate.

12. The method of claim 11, wherein distances between the magnetic dots correspond to spacing distances between the spacers arranged on the flat panel device.

* * * * *